United States Patent [19]
Harris et al.

[11] Patent Number: 5,161,685
[45] Date of Patent: * Nov. 10, 1992

[54] FLEXIBLE LIGHT-TIGHT ENCLOSURE FOR PHOTOSENSITIVE WEB ROLL

[75] Inventors: Clark E. Harris, Fairport; Julie D. Stone; Thomas C. Healey, both of Rochester; Paul J. Szwejbka, Fairport, all of N.Y.

[73] Assignee: Eastman Kodak Company, Rochester, N.Y.

[*] Notice: The portion of the term of this patent subsequent to Apr. 21, 2009 has been disclaimed.

[21] Appl. No.: 738,720

[22] Filed: Jul. 31, 1991

[51] Int. Cl.$^5$ .......................................... B65D 85/672
[52] U.S. Cl. ..................... 206/397; 206/53; 206/409; 206/410; 206/415
[58] Field of Search ................. 206/397, 398, 401, 53, 206/408, 409, 410, 411, 413, 414, 415, 416, 455; 242/55.53, 71.7

[56] References Cited

U.S. PATENT DOCUMENTS

| | | |
|---|---|---|
| 172,039 | 1/1876 | Lazarevitch . |
| 205,028 | 6/1878 | Alexander . |
| 207,675 | 9/1878 | Peck ................................. 206/409 |
| 1,076,635 | 10/1913 | Howard . |
| 1,082,964 | 12/1913 | Macdonald . |
| 1,665,576 | 4/1928 | Witham . |
| 2,303,173 | 11/1942 | Roehrl ............................. 206/409 |
| 2,646,877 | 7/1953 | Scholl ............................... 206/52 |
| 3,186,892 | 6/1965 | Walthers ......................... 206/409 |
| 3,402,809 | 9/1968 | Snyder ............................ 206/410 |
| 3,612,424 | 10/1971 | Friedel ............................ 242/71.1 |
| 3,642,189 | 2/1972 | Widenback ....................... 229/7 R |
| 4,101,026 | 7/1978 | Bonk .............................. 206/410 X |
| 4,272,035 | 6/1981 | Sherman et al. ............ 2452/71.7 X |
| 4,535,912 | 8/1985 | Bonk ............................. 206/409 X |
| 4,650,073 | 3/1987 | Young ............................. 206/409 |
| 4,658,959 | 4/1987 | Inoue .............................. 206/409 |
| 4,741,439 | 5/1988 | Bizic ............................. 242/71.7 X |
| 4,793,485 | 12/1988 | Bertolotti .................... 206/414 X |
| 5,003,970 | 4/1991 | Parker et al. ................... 128/90 |

Primary Examiner—Paul T. Sewell
Assistant Examiner—Jacob K. Ackun, Jr.
Attorney, Agent, or Firm—Clyde E. Bailey

[57] ABSTRACT

A light-tight enclosure for storing and dispensing a roll of photosensitive web material wound about a hollow cylindrical core having open opposite ends. The enclosure comprises a flexible opaque bag with opposite sidewalls extending between opposing rearward and forward portions and opposing upper and lower portions. Each sidewall has a central aperture therein congruent with each core end. The rearward portion defines a closable opening for receiving the roll. A shallow neck portion projects from the forward portion to an end thereof defining an exit slot for dispensing the web material. A collar fits tightly inside each core end, with an annular flange thereon facing axially outward. An annular ring is attachable to each collar in spaced, inward-facing relation to the flange. The roll is first positioned in the bag, through its closable opening, so that the web material extends into the neck portion and out through the exit slot, and so that a central portion of the collar at each core end projects outwardly through the adjacent sidewall aperture, with its flange left inside the sidewall and facing an annular portion thereof surrounding the aperture. The annular ring is then attached to the outwardly projecting portion of the collar in closely spaced, inward-facing relation to the sidewall annular portion, which is thus loosely trapped between the flange and the ring. The bag opening is then closed, and the bag neck portion is folded back and secured against the bag forward portion.

10 Claims, 9 Drawing Sheets

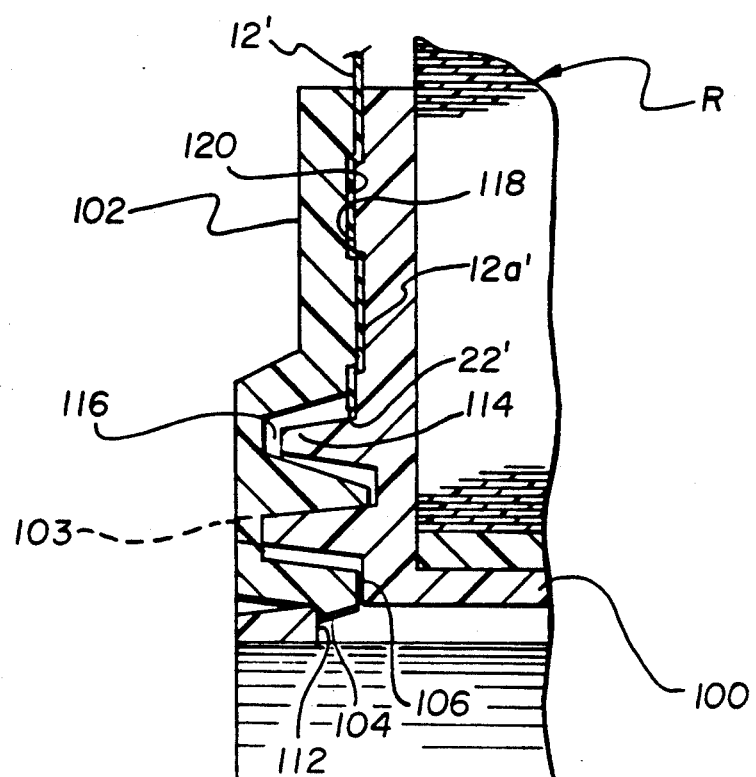
FIG. 11
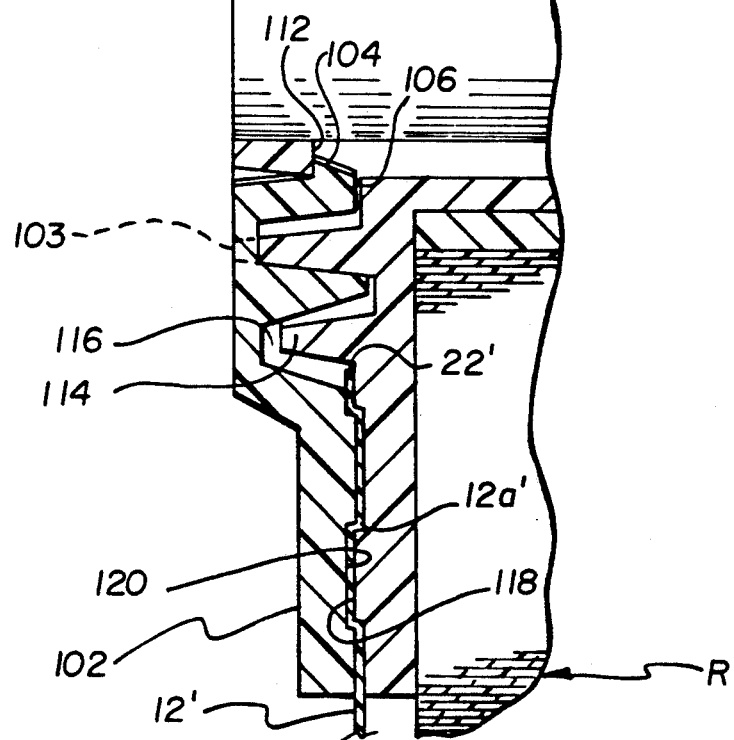

FLEXIBLE LIGHT-TIGHT ENCLOSURE FOR PHOTOSENSITIVE WEB ROLL

CROSS-REFERENCE TO RELATED APPLICATION

Reference is made to commonly assigned, copending, related U.S. patent application Ser. No. 739,016, filed concurrently herewith in the names of Clark E. Harris et al. and titled METHOD FOR LIGHT-TIGHTLY ENCLOSING A PHOTOSENSITIVE WEB ROLL.

BACKGROUND OF THE INVENTION

1. Field of the Invention

The present invention relates generally to enclosures for photosensitive material, and particularly to a flexible enclosure adapted to lighttightly store and dispense a roll of photosensitive web material.

2. Description of the Prior Art

Heretofore, photosensitive color-print paper has been supplied to minilab stations in either of two different types of container. One is a paper bag, the other an injection-molded disposable cartridge. Each protects the paper stock roll therein from physical damage and light. The disposable cartridge is both costly and wasteful. The most popular paper bag must be unloaded in the dark, in order to safely transfer its stock roll to a cartridge used by the minilab. Such work in the dark can be awkward and time-consuming. There has thus been a need for a practical, convenient, and reliable light-tight enclosure in which a photosensitive paper stock roll can be efficiently supplied to a minilab station without requiring the operator to work in the dark, preferably such an enclosure that can be daylight-loaded into either a minilab cartridge or the minilab machine itself, and preferably such an enclosure that is not only economical to make and use but also readily recyclable for further use of its constituent parts.

In the prior art, U.S. Pat. No. 3,612,424 discloses a generally rigid storage and dispensing magazine for rolled strips of light-sensitive material, comprising a cylindrical housing with inwardly directed core-mounting hubs at opposite ends thereof and a tangentially extending dispensing spout. While the magazine there disclosed may have sufficed for its intended purpose, it does not fulfill the present need set forth hereinabove.

SUMMARY OF THE INVENTION

The primary object of this invention has been to meet the foregoing need. That object and others have been achieved by the invention herein disclosed and claimed.

This invention finds utility in a flexible enclosure that is adapted to light-tightly store and dispense a roll of photosensitive web material for use in cooperating apparatus, the roll including an elongate strip of such material wound about a hollow cylindrical core having open opposite ends.

The enclosure comprises: a flexible opaque bag configured to enclose the roll, the bag including opposite sidewalls extending between opposing rearward and forward portions and between opposing upper and lower portions, each of the sidewalls having a centrally disposed aperture therein substantially congruent with one of the core ends, the rearward portion initially defining a closable opening through which the roll can pass into the bag, the bag further including a shallow neck portion projecting forwardly from the forward portion to a distal end thereof defining an exit slot through which the strip of web material can pass; a pair of flanged collars, each of which includes an axially extending cylindrical portion adapted to fit tightly inside one of the core ends and an annular flange portion extending radially outward from the cylindrical portion to axially face that core end; and a pair of annular rings, each of which is matably attachable to one of the collars in axially closely spaced inward-facing relation to the flange portion thereof.

The cylindrical portion of each collar is pressed tightly inside a respective one of the core ends so that the flange portion of the collar closely faces that core end. The roll is positioned in the bag, through the closable opening in its rearward portion, so that a leading end portion of the web material strip extends from the roll forwardly into the neck portion and out through the exit slot, and so that the collar on each core end is axially aligned with the aperture in a respective one of the sidewalls, whereby the flange portion of that collar lies in axially close outward-facing relation to an annular portion of the sidewall surrounding that aperture. Each annular ring is then matably attached to a respective one of the collars in axially closely spaced relation to the flange portion thereof so that the ring lies in axially close inward-facing relation to the sidewall annular portion, whereby that annular portion is light-lockingly trapped between the flange portion and the ring. The closable opening in the rearward portion of the bag is thereupon light-tightly closed, and the neck portion of the bag, with the leading end portion of the web material strip extending through the exit slot, is then folded back upon itself and secured in a storage position against the forward portion of the bag.

This invention, and its objects and advantages, will become more apparent in the detailed description of its illustrated embodiments presented hereinbelow.

BRIEF DESCIRPTION OF THE DRAWINGS

In the detailed description of the embodiments of this invention presented below, reference is made to the accompanying drawings, wherein like reference characters denote like elements, and wherein.

Figure 9:
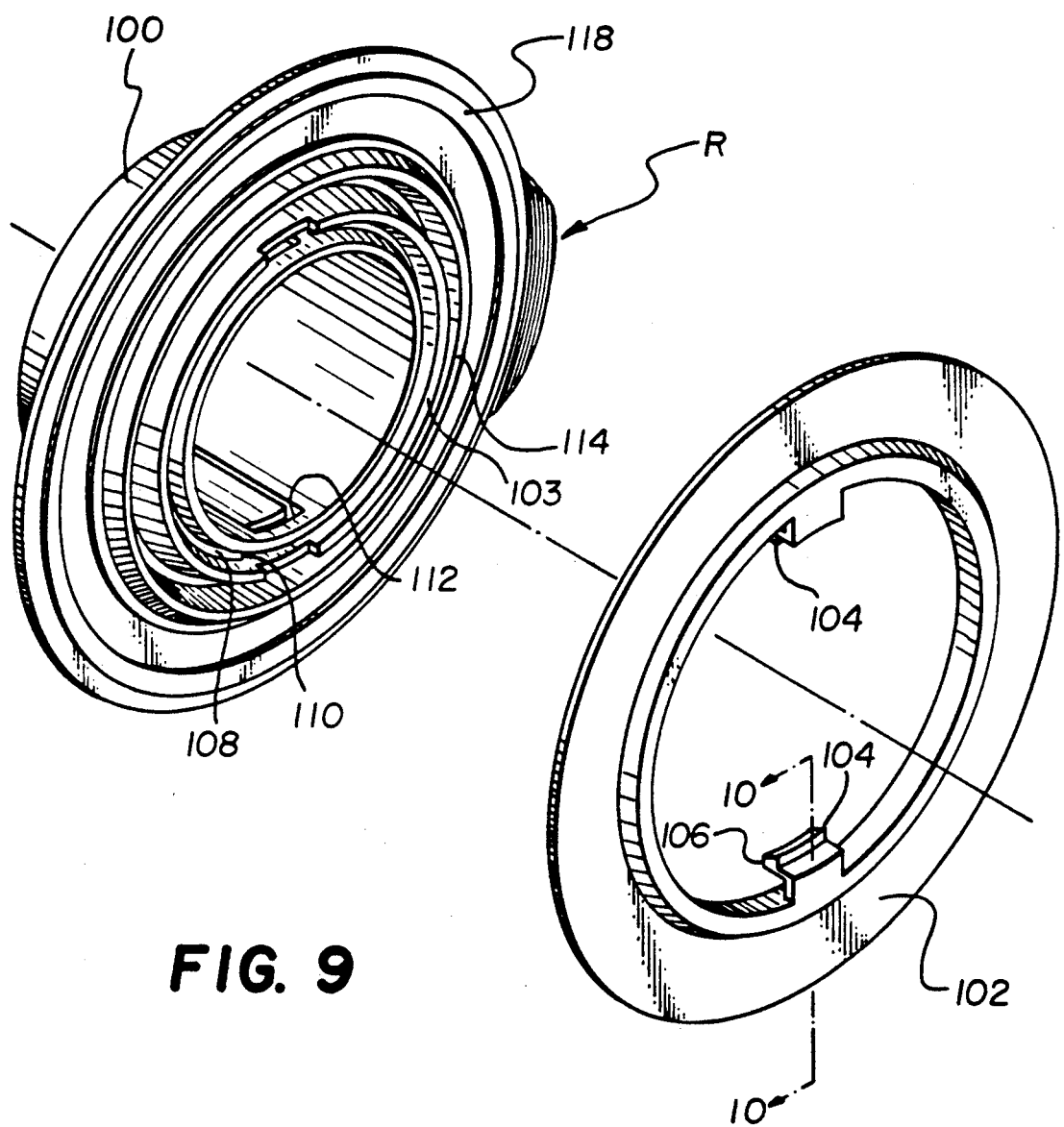
FIG. 9 is an exploded partial perspective view illustrating two other components of the enclosure as configured according to a second (the preferred) embodiment of this invention.
Figure 10:
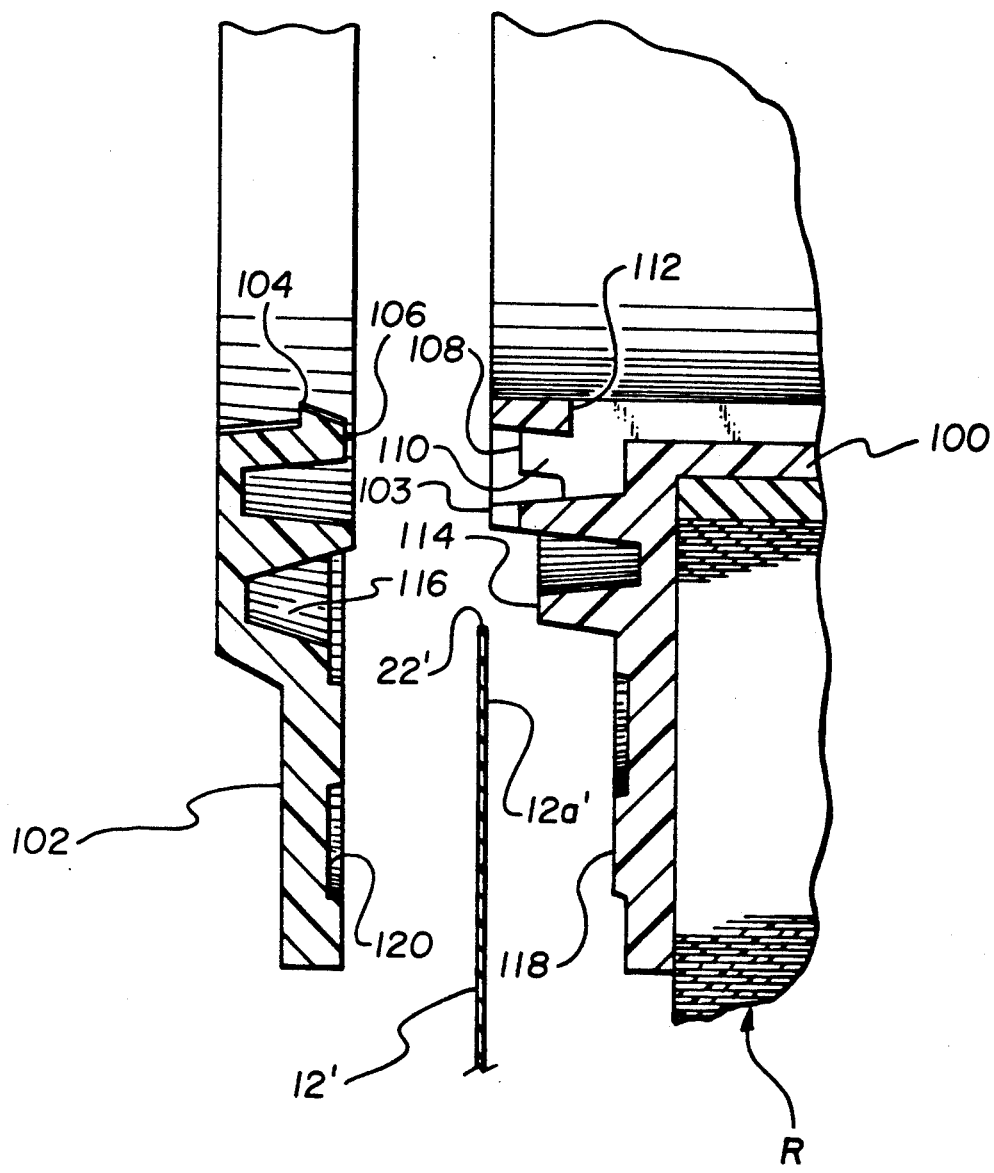

FIG. 10 is an enlarged, exploded, partial sectional view, taken generally along line 10—10 in FIG. 9, revealing mating relationships of the two spaced-apart components there shown, with part of the flexible bag component disposed therebetween; and FIG. 11 is a sectional view similar to FIG. 10 but depicting the interfitting relationships among all three components there shown when brought together in accordance with the second embodiment.

DESCRIPTION OF THE ILLUSTRATED EMBODIMENTS

Because certain parts of photosensitive web roll enclosures are well known, the following description is directed in particular to those elements forming, cooperating directly with, or relating to, this invention. Elements not specifically shown or described herein are selectable from those known in the relevant art.

THE FIELD EMBODIMENT

Figure 1:
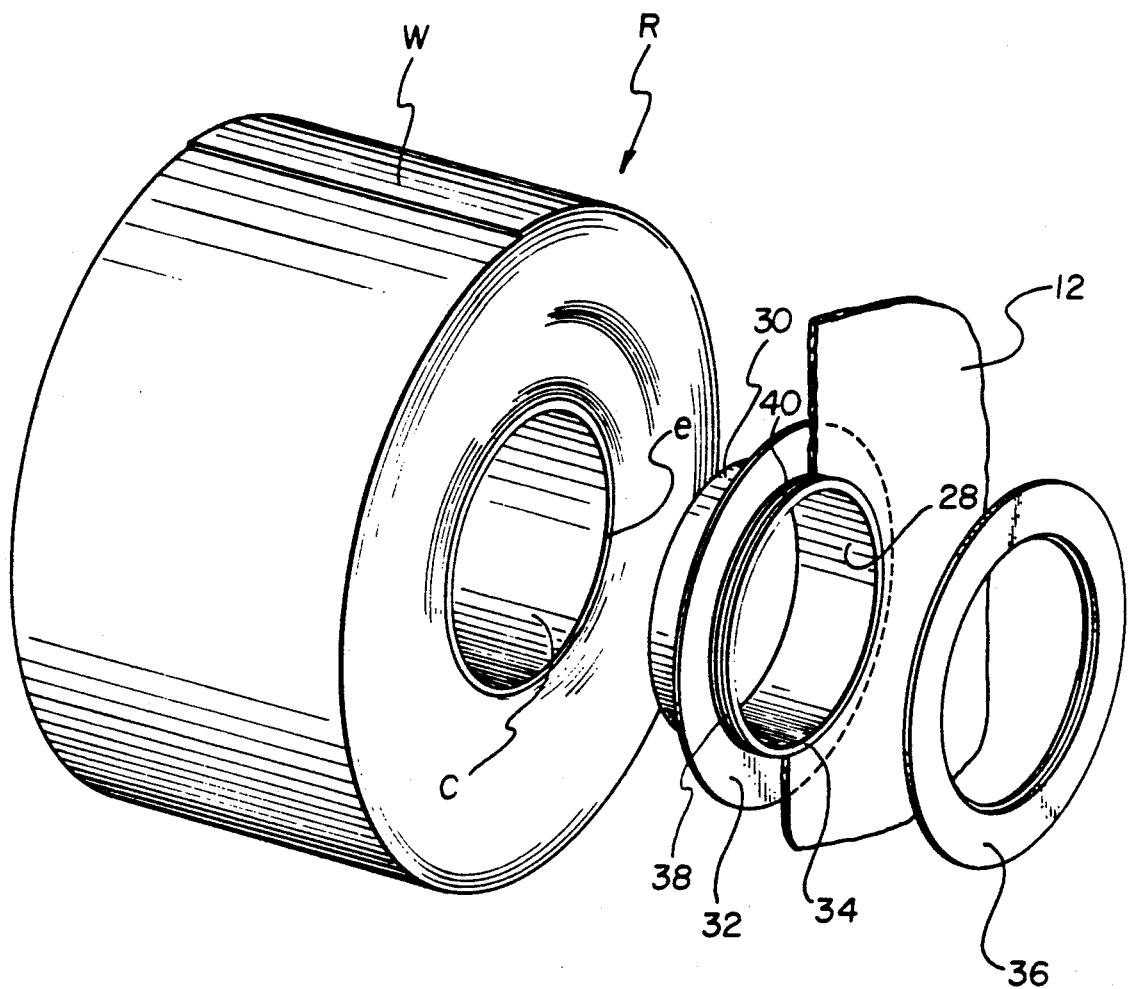
FIG. 1 is an exploded partial perspective view illustrating a photosensitive web roll and fragments of a flexible enclosure adapted, in accordance with a first embodiment of this invention, to light-tightly enclose the web roll.

The first embodiment of this invention is depicted in FIGS. 1–8. FIG. 1 illustrates a roll R of photosensitive web material W intended for use in cooperating apparatus. The web material W may comprise, for example, a wound strip of color-print paper intended for exposure and processing in a minilab facility. Roll R comprises an elongate strip of such material wound about a hollow cylindrical core c having open opposite ends e (only one shown). Core c typically is formed from a paperboard material but may instead be made of extruded plastic.

Figure 2:
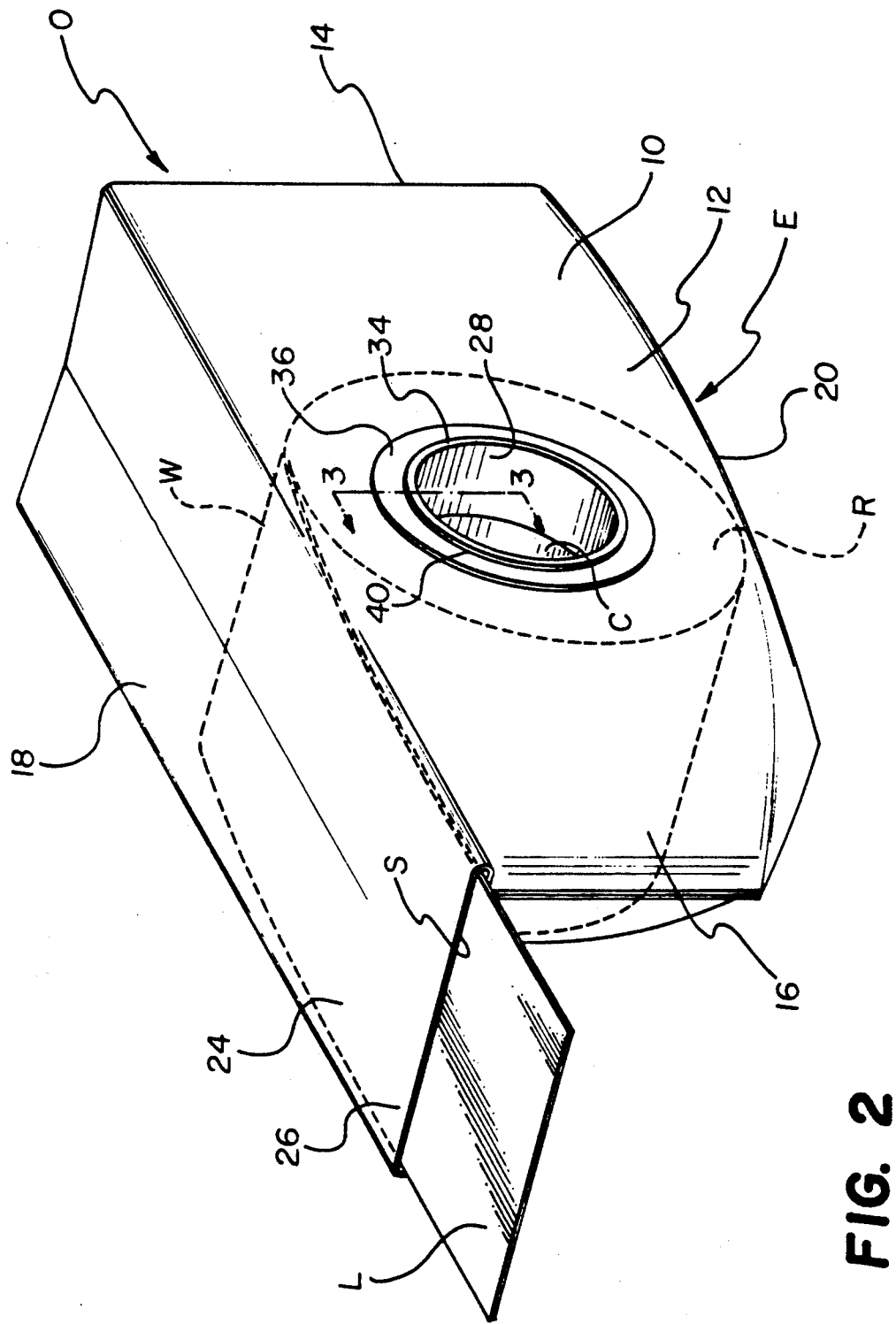
FIG. 2 is a perspective view depicting the flexible enclosure shown fragmentally in FIG. 1, with the web roll fully received therein.

As depicted in FIG. 2, the flexible enclosure E of this invention is adapted to light-tightly store roll R therein and dispense its web material W for use in the aforementioned apparatus. Enclosure E comprises a flexible opaque bag 10, preferably made from a thin, flexible, opaque, plastic sheet material such as high-density polyethylene approximately 0.005 inches (0.127 mm) thick. Configured to enclose the roll R, bag 10 includes a pair of opposite sidewalls 12 (one shown) extending between opposing rearward and forward portions 14 and 16, respectively, and between opposing upper and lower portions 18 and 20, respectively. Each of the bag sidewalls 12 has a centrally disposed aperture 22 therein (see FIG. 8) that is substantially congruent with one of the core ends e. The bag rearward portion 14 initially defines a closable opening O through which roll R can be inserted into the bag. Bag 10 further includes a shallow neck portion 24 that projects forwardly from bag forward portion 16 to a distal end 26 thereof defining an exit slot s, through which the strip of web material W can be withdrawn from the bag.

Figure 3:
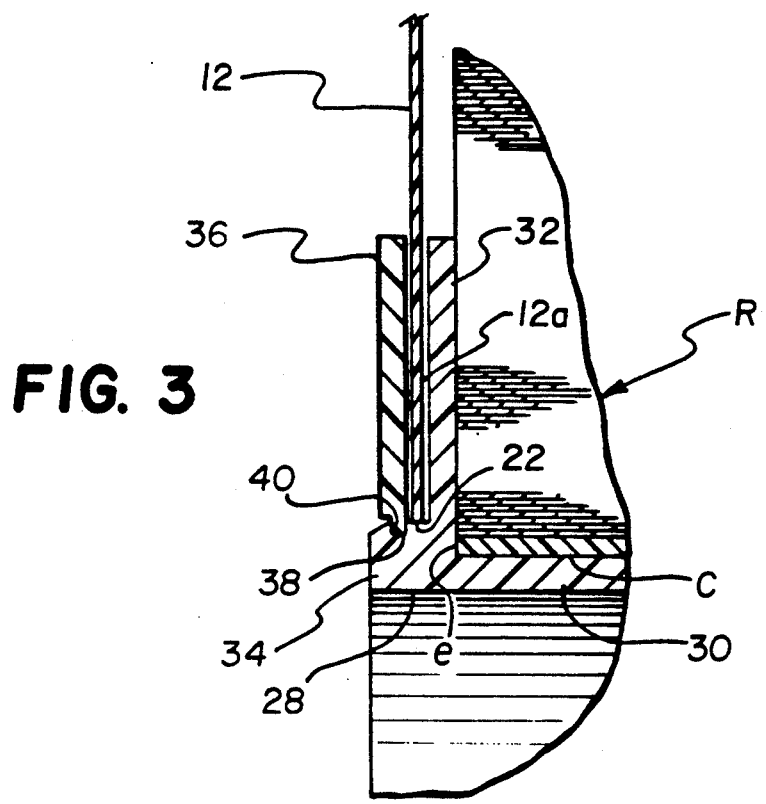
FIG. 3 is an enlarged partial sectional view, taken along line 3—3 in FIG. 2, revealing certain interfitting relationships between the web roll and the flexible enclosure when brought together as depicted in FIG. 2.

As shown most clearly in FIGS. 1 and 3, enclosure E also comprises a pair of flanged collars 28, each including an axially inwardly extending cylindrical portion 30 adapted to fit tightly inside one of the axially outwardly directed core ends e, an annular flange portion 32 that extends radially outward from cylindrical portion 30, to axially inwardly face that core end, and a cylindrical extension 34 that extends axially outward from flange portion 32 and is adapted to project outwardly through the aperture 22 in one of the bag sidewalls 12.

As shown in FIGS. 1–4, enclosure E further comprises a pair of annular rings 36, each being matably attachable to the cylindrical extension 34 on one of the collars 28 in axially closely spaced inward-facing relation to flange portion 32. Each cylindrical extension 34 is provided with means 38, such as a suitably disposed and dimensioned circumferential groove 40 therein, for matably receiving one of the rings in said inward-facing relation to flange portion 32.

In assembling the foregoing components of enclosure E, the cylindrical portion 30 of each collar 28 is first pressed tightly inside a respective one of the core ends e so that the flange portion 32 of each collar closely faces the adjacent core end.

The roll R, with both collars pressed into its core ends as just described, is then positioned inside bag 10, through the closable opening 0 in bag rearward portion 14, so that a leading end portion L of the web material strip W extends from the roll forwardly into bag neck portion 24 and thence out through exit slot s as shown, and so that the collar at each core end is axially aligned with the aperture 22 in a respective one of the bag sidewalls 12. When roll R is so positioned, the flange portion 32 of each collar lies in axially close outward-facing relation to an annular portion 12a of the respective sidewall 12 surrounding aperture 22, and the cylindrical extension 34 extending axially outward from flange portion 32 projects outwardly through aperture 22.

Each annular ring 36 is then snap-fitted into the circumferential groove 40 in a respective one of the outwardly projecting cylindrical extensions 34, so as to lie in axially close inward-facing relation to the sidewall annular portion 12a surrounding the aperture through which that cylindrical extension 34 projects, whereby each sidewall annular portion 12a is light-lockingly trapped between an axially closely spaced outward-facing flange portion 32 (inside the bag) and an axially closely spaced inward-facing annular ring 36 (outside the bag), as shown most clearly in FIG. 3.

The still-open rearward portion 14 of the bag is then folded and light-tightly sealed closed. The sealing may be achieved conveniently by applying a suitable strip of adhesive tape t (see FIG. 4).

Figure 4:
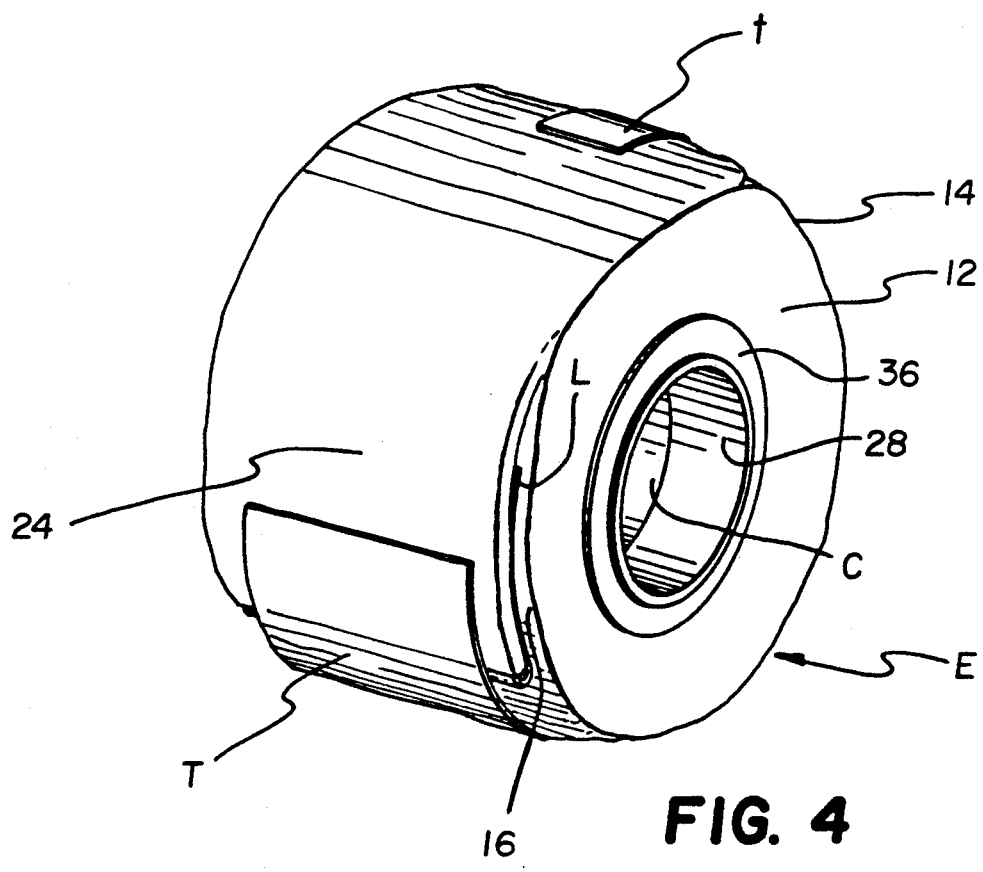
FIG. 4 is a perspective view illustrating the flexible enclosure of FIG. 2 when folded about the web roll therein and taped closed.

To light-tightly secure roll R inside enclosure E during storage, shipment, and handling, the bag neck portion 24, with the web material strip leading end portion L extending through exit slot s, is then folded back upon itself and secured in a storage position against forward portion 16 by another strip of adhesive tape T (again see FIG. 4). When enclosure E is to be operatively disposed to dispense the web material strip W therefrom, tape T is removed and neck portion 24 is unfolded from its just-described storage position to a dispensing position wherein the neck portion extends forwardly from forward portion 16 in general alignment with one of the upper and lower portions 18 and 20, preferably upper portion as depicted in FIG. 2, whereby bag 10 when operatively disposed has a generally L-shaped configuration (as viewed from the side).

Because of the above-described closely spaced relationship between each bag sidewall annular portion 12a and the adjacent flange portion 32 and annular ring between which the annular portion is light-lockingly trapped (see FIG. 3), the roll core c, the collars 28 thereon, and the rings 36 on the collars are together freely rotatable relative to the bag. Thus, when enclosure E is operatively disposed to dispense the web material strip, bag 10 remains stationary as the strip is drawn freely from the web roll and out through the exit slot.

Figure 5:
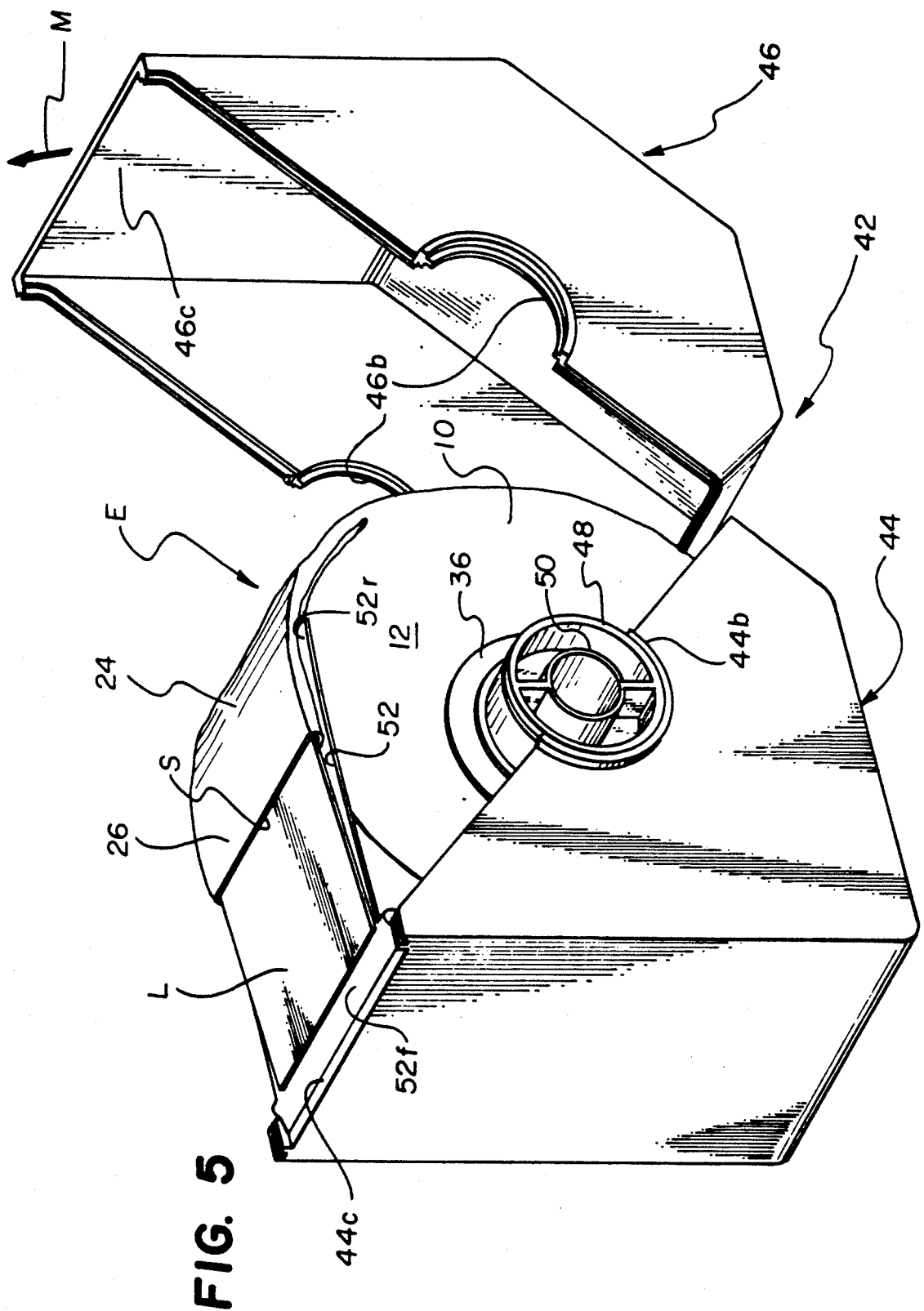
FIG. 5 is a perspective view depicting the flexible enclosure of FIG. 4 when mounted in a cooperating cartridge, with a neck portion of the enclosure unfolded and operatively positioned to dispense web material from the roll.

As illustrated in FIG. 5, the enclosure E with web roll R enclosed therein may conveniently be mounted in a cooperating cartridge 42 adapted for use in a minilab machine. Cartridge 42 comprises a lower housing section 44 and a mating upper housing section 46, which is hingedly connected to the lower housing section for pivotal movement (in the direction of arrow M) from an open position (shown in FIG. 5) to a closed position (not shown) fully enclosing the web roll. It will be noted that the opposing sidewalls of housing sections 44 and 46 are provided with semicircular grooved bearing surfaces 44b and 46b, respectively, which in the closed position form corresponding circular grooved bearings configured to seat a pair of mating hubs 48 (one shown) at the outer ends of tubular spindle means 50. The spindle means 50 is adapted to fit slidably inside the collar 28 at each end of roll core c, and thereby support the collars, the rings thereon, and the web roll for rotation relative thereto. It will also be appreciated that the top-front corner portions 44c and 46c of the two housing sections are configured to provide a cartridge exit port therebetween when in their closed position. A stiff sheet-like member 52 (made of paperboard or plastic) is shown with its rear end 52r inserted under the bag neck portion 24 and its front end 52f disposed on corner portion 44c, to provide support for the neck portion when in its dispensing position, and to support and guide the web material strip leading end portion L in its intended pathway between the neck portion exit slot s and the cartridge exit port. In practice, the leading end portion L is withdrawn beyond corner portion 44c to leave a readily graspable length thereof extending outside the cartridge before the two housing sections are closed. The cartridge can then be operatively disposed in cooperating apparatus, and its web material leading end portion L then connected thereto for intended exposure and processing.

When all of the web material has been withdrawn, the cartridge can be removed from the apparatus, and the exhausted flexible enclosure removed from the cartridge. An advantageous feature of this invention is that the web-roll core, the collars thereon, the rings on the collars, and the flexible bag can all be made from recyclably compatable plastic materials, so that the exhausted flexible enclosure can be readily recycled as a whole, without costly separation and separate handling of its component parts.

Another advantageous feature of this invention is that the light-tight flexible enclosure E with web roll R enclosed therein may, alternatively, be mounted directly in the cooperating apparatus, e.g., a minilab machine, without need of a cartridge. In that application, the flexible enclosure can be mounted in operative relation to structure in the apparatus, analogous to that described above, for locating and rotatably supporting the roll core, for supporting the bag neck portion, and for supporting and guiding the web material strip outside the neck portion.

Figure 6:
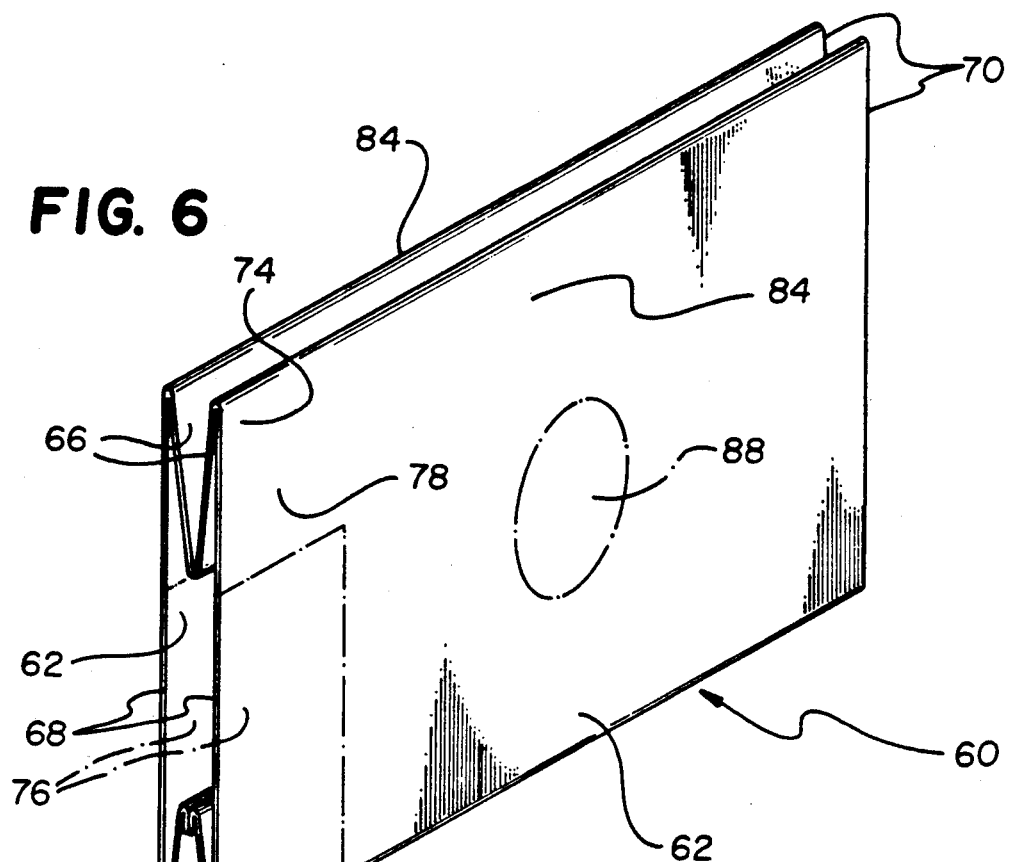
FIG. 6 is a perspective view of a rectangular plastic sleeve from which a flexible bag component of the enclosure is formed.
Figure 7:
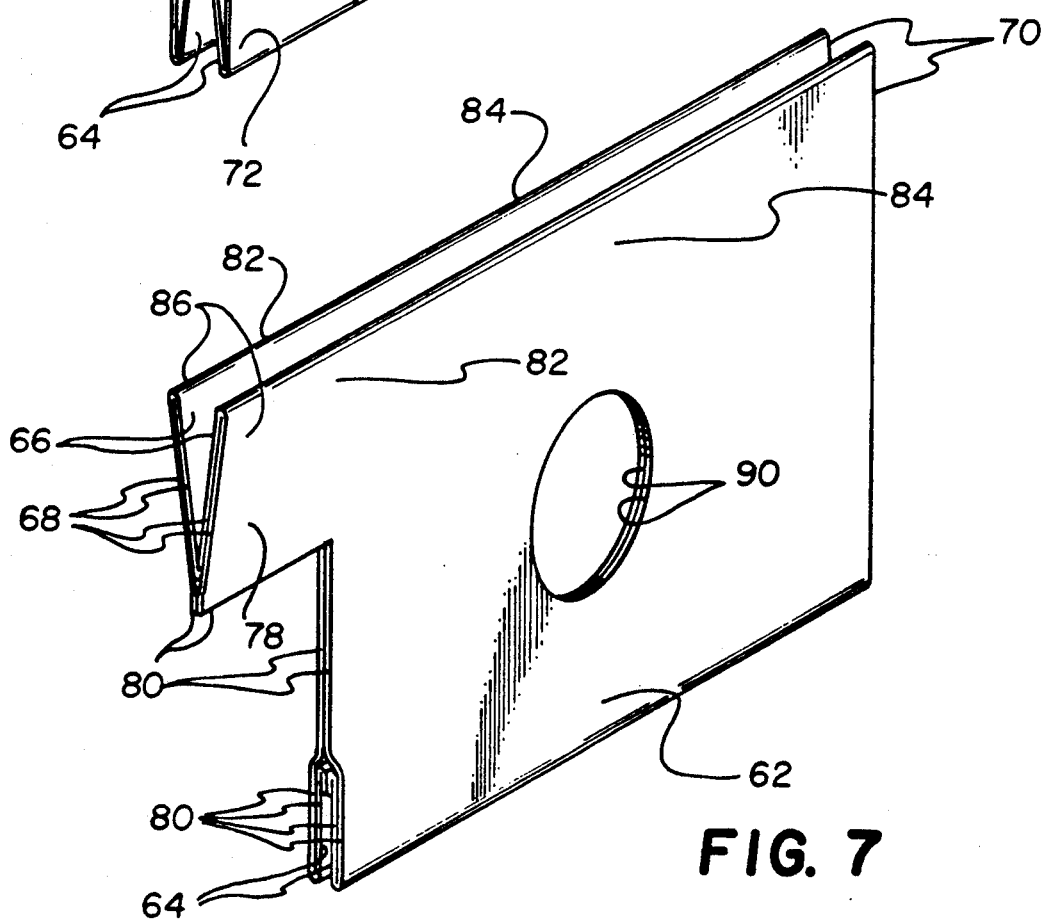
FIG. 7 is a perspective view of the flexible bag component formed from the sleeve shown in FIG. 6.
Figure 8:
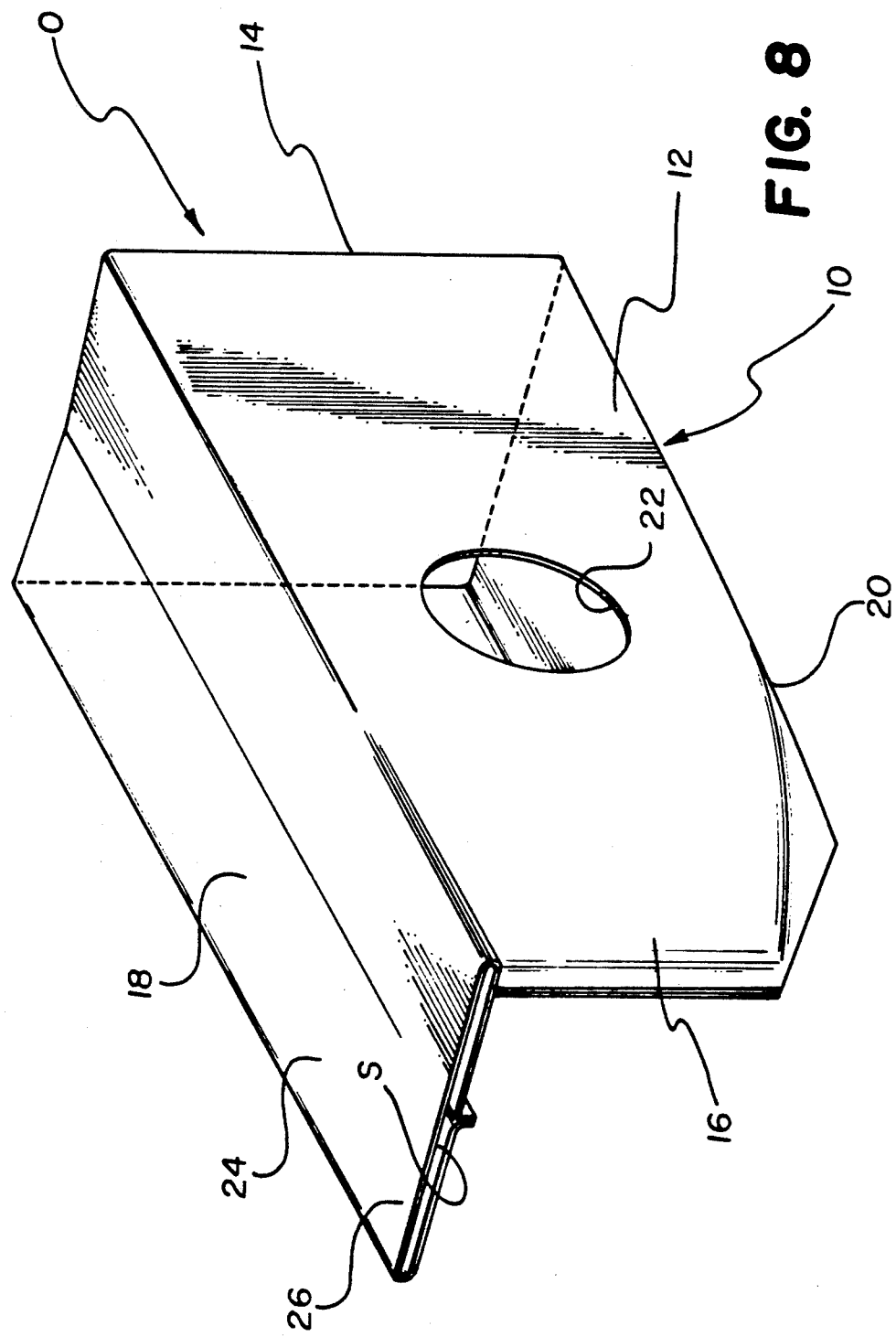
FIG. 8 is a perspective view illustrating the flexible bag component of FIG. 7 when fully unfolded to receive the web roll therein as depicted in FIG. 2.

FIGS. 6–8 illustrate steps involved in providing the flexible bag 10. Those steps include forming a substantially flat rectangular sleeve 60 (see FIG. 6) from a thin, flexible, opaque, plastic sheet material, such as the aforementioned high-density polyethylene approximately 0.005 inches (0.127 mm) thick. Sleeve 60 has a pair of opposing rectangular side panels 62 joined together along bottom and top portions 64 and 66 thereof that extend longitudinally between unjoined front and rear edges 68 and 70. The bottom and top portions 64 and 66 and the front edges 68 together define, respectively, bottom-front and top-front corners 72 and 74 of the sleeve. The bottom and top portions 64 and 66 are folded inwardly toward each other between the side panels as shown.

The next step (see FIGS. 6 and 7) entails removing a lower corner portion 76 of the sleeve (shown in FIG. 6 as delimited by dash-dotted lines) emanating from its bottom-front corner 72, leaving intact an upper corner portion 78 emanating from its top-front corner 74. Side panel edges 80 that result from removing lower corner portion 76 are then joined together (as shown in FIG. 7). Each side panel thus assumes a generally L-shaped configuration 82 that comprises a main portion 84, extending between the now-joined side-panel edges 80 and the still-unjoined rear edges 70, and a narrow portion 86 extending from main portion 84 to the unjoined front edges 68 of remaining upper corner portion 78.

Another step (FIGS. 6 and 7) entails removing a circular portion 88 (shown in FIG. 6 as delimited by dash-dotted lines), substantially congruent with one of the roll core ends e, from a central area of each side-panel main portion 84, leaving a centrally disposed circular opening 90 (FIG. 7), so congruent, in each main portion.

The final step (see FIGS. 7 and 8) involves spreading apart the opposing side panels 62, thereby unfolding the inwardly folded bottom and top portions 64 and 66 therebetween and thus providing the flexible opaque bag 10. The spread-apart side-panel main portions 84 form the bag sidewalls 12. The circular opening 90 in each main portion 84 provides the central aperture 22 in each sidewall. The spread-apart main-portion still-unjoined rear edges 70 provide the bag rearward portion 14 defining the closable opening 0. The spread-apart main-portion now-joined edges 80 provide part of the bag forward portion 16. The now-unfolded side-panel bottom and top portions 64 and 66 between the spread-apart main portions 84 form the bag lower and upper portions 20 and 18 respectively. The spread-apart side-panel narrow portions 86 and now-unfolded top portions 66 therebetween together form the bag neck portion 24, and their unjoined front edges 68 together form the neck portion distal end 26 defining the exit slot s. The resulting bag 10, shown in FIG. 8, is then ready for insertion and positioning of web roll R therein as already described with reference to FIG. 2.

THE SECOND (PREFERRED) EMBODIMENT

A second (preferred) embodiment of this invention is depicted in FIGS. 9–11. This embodiment relates to a different way of fastening the ring to its mating collar at each end of the web roll core. In other respects, this embodiment is identical to the first embodiment described above.

FIG. 9 shows, in perspective, a fragment of the web roll R, a flanged collar 100 aligned therewith, and an annular ring 102 aligned with the collar. Collar 100 has a substantially cylindrical extension 103 that extends axially outward from the collar flange portion and is adapted to project outwardly through the bag sidewall aperture. Ring 102 has two diametrically opposed, resiliently flexible latch fingers 104 that extend both radially inward and axially inward (toward collar 100) to engage mating structure on the collar extension 103. FIG. 10 shows, in section, fragments of collar 100 and ring 102 in spaced alignment with a portion of bag sidewall 12' disposed therebetween.

When the collar and ring are coaxially aligned as shown, a latch face 106 on each latch finger 104 is in position to enter a latch-receiving groove 108 in the collar extension 103. Entry of latch face 106 into groove 108 keeps the ring and collar coaxially aligned while the ring is rotated until face 106 enters a latch-receiving opening 110 in the collar extension. Entry of latch face 106 into opening 110 indicates that the ring and collar are angularly aligned for a further axially inward thrust of face 106, which follows until latch finger 104 snaps into engagement with a latch-receiving rib 112 on the collar extension. This way of fastening the ring to the collar is especially advantageous when assembling the flexible enclosure in the dark.

To preclude any light-leaking into the bag between the ring and the collar, a continuous tapered rib 114 is provided on the collar to enter a continuous mating groove 116 in the ring, and a continuous annular rib 118 is provided on the collar to enter a continuous corresponding groove 120 in the ring. In this embodiment, the bag sidewall aperture 22' is made somewhat larger then aperture 22 of the first embodiment, in order to accommodate the greater diameter of rib 114; and the rib 118 and groove 120 provide a labyrinthine path in which the sidewall annular portion 12a' surrounding aperture 22' is light-lockingly trapped as the collar and ring together rotate relative thereto.

FIG. 11 illustrates the interfitting and cooperating relationships that result when the components shown in FIG. 10 are fully assembled in accordance with this embodiment.

The second embodiment need not be limited to use of only two latch fingers 104 and latch-receiving openings 110 and ribs 112, as more than two of each in appropriate mating relationship could as well be provided. Also, alternative locations and configurations of the continuous ribs 114 and 118 and mating grooves 116 and 120 could be adopted.

Thus, although the present invention has been described with particular reference to its two embodiments illustrated herein, it will be understood by those skilled in the art that further variations and modifications could still be effected within the scope of this invention as defined by the claims set forth below.

We claim:

1. A flexible enclosure adapted to light-tightly store and dispense a roll of photosensitive web material for use in cooperating apparatus, the roll including an elongate strip of such material wound about a hollow cylindrical core having open opposite ends, said enclosure comprising:

a flexible opaque bag configured to enclose the roll, said bag including opposite sidewalls extending between opposing rearward and forward portions and between opposing upper and lower portions, each of said sidewalls having a centrally disposed aperture therein substantially congruent with one of said core ends, said rearward portion initially defining a closable opening through which the roll can pass into said bag, said bag further including a shallow neck portion projecting forwardly from said forward portion to a distal end thereof defining an exit slot through which the strip of web material can pass;

a pair of flanged collars, each of said collars including an axially extending cylindrical portion adapted to fit tightly inside one of said core ends and an annular flange portion extending radially outward from said cylindrical portion to axially face said one core end; and a pair of annular rings, each of said rings being matably attachable to one of said collars in axially closely spaced inward-facing relation to said flange portion thereof;

said cylindrical portion of each collar being pressed tightly inside a respective one of said core ends so that said flange portion of said collar closely faces said core end;

the roll being positioned in said bag, through said closable opening in said rearward portion thereof, so that a leading end portion of the web material strip extends from. the roll forwardly into said neck portion and out through said exit slot, and so that said collar on each core end is axially aligned with said aperture in a respective one of said sidewalls, whereby said flange portion of said collar lies in axially close outward-facing relation to an annular portion of said sidewall surrounding said aperture;

each annular ring then being matably attached to a respective one of said collars in axially closely spaced relation to said flange portion thereof so that said ring lies in axially close inward-facing relation to said sidewall annular portion, whereby said sidewall annular portion is light-lockingly trapped between said flange portion and said ring;

said closable opening in said rearward portion of said bag thereupon being light-tightly closed; and said neck portion of said bag, with said leading end portion of the web material strip extending through said exit slot, then being folded back upon itself and secured in a storage position against said forward portion of said bag.

2. A flexible enclosure as claimed in claim 1 wherein said bag is made from a plastic material including high-density polyethylene.

3. A flexible enclosure as claimed in claim 1 wherein the roll core, said collars thereon, said rings on said collars, and said bag are all made from recyclably compatible plastic materials.

4. A flexible enclosure as claimed in claim 1 wherein each of said collars further includes a substantially cylindrical extension projecting axially outward from said flange portion through said sidewall aperture, with means thereon for matably receiving one of said rings in said axially closely spaced inward-facing relation to said flange portion.

5. A flexible enclosure as claimed in claim 4 wherein said receiving means includes a groove in said extension configured to receive a mating portion of said ring.

6. A flexible enclosure as claimed in claim 4 wherein one of said collar and said ring at each core end includes an annular projection extending toward the other of said collar and said ring, and wherein said other of said collar and said ring includes an annular recess facing said annular projection and matable therewith to prevent passage of light between said collar and said ring when said ring is in said axially closely spaced inward-facing relation to said flange portion.

7. A flexible enclosure as claimed in claim 6 wherein said one of said collar and said ring at each core end is said collar, and wherein said other of said collar and said ring is said ring.

8. A flexible enclosure as claimed in claim 1 wherein, when said enclosure is operatively disposed to dispense the web material strip, said neck portion is unfolded from said storage position thereof to a dispensing position in which said neck portion extends forwardly from said forward portion in general alignment with one of said upper and lower portions, whereby said bag when operatively disposed has a generally L-shaped configuration.

9. A flexible enclosure as claimed in claim 8 wherein the roll core, said collars thereon, and said rings on said collars are together freely rotatable relative to said bag; and wherein, when asid enclosure is operatively disposed to dispense the web material strip, said bag remains stationary ar the strip is drawn from the roll and out through said exit slot.

10. A flexible enclosure as claimed in claim 9 wherein said collars are adapted to be supported by mating spindle means for rotation relative thereto as the web material strip is drawn from the roll; and wherein said neck portion of said bag is adapted to be supported in said dispensing position thereof when said enclosure is operatively disposed to dispense the web material strip.

* * * * *